July 6, 1943. J. KAFOWI Re. 22,341

METHOD OF PRODUCING ELONGATED BODIES BY DEFORMATION

Original Filed July 24, 1937

INVENTOR.
JOHANN KAFOWI

BY J. O. Allen,

ATTORNEY.

Reissued July 6, 1943

Re. 22,341

UNITED STATES PATENT OFFICE 22,341

METHOD OF PRODUCING ELONGATED BODIES BY DEFORMATION

Johann Kafowi, Long Island City, N. Y., assignor of one-half to Friedrich Goldschmidt, Prague, Czechoslovakia Original No. 2,200,231, dated May 7, 1940, Serial No. 155,559, July 24, 1937. Application for reissue May 6, 1942, Serial No. 441,922

6 Claims. (Cl. 207—10)

This invention relates to a method for producing articles of metal or any other suitable material, in particular but not exclusively tubes and rods by extrusion.

According to the present invention a blank or billet is heated to a temperature near to but below its melting point before being subjected to an instantaneous impact action such as a hammer blow in a die of a press.

The expression "a temperature near to but below its melting point" is intended to mean a temperature at which the blank or billet is in an almost plastic condition, that is a condition under which the blank or billet offers sufficient resistance to tongs or other implements used for inserting it into or positioning it on the die without being deformed by said tongs or implements. Such a condition of the blank or billet has been found to be ideal for shaping it in or by the die under an instantaneous impact action for the reason that such condition ensures perfect flow of the material which is not checked by loss of temperature occurring between the successive operations of positioning the billet or blank upon or into the die and exerting an instantaneous impact. The kinetic energy or momentum of the latter is transformed into heat which may compensate to some extent for slight heat losses occurring between the positioning of the billet or blank in or on the die and the impact.

In carrying the invention into effect any known kind of press may be employed provided that it is capable of exerting an instantaneous impact action upon the blank or billet to be extruded through or shaped by a die. In other words the blank or billet must be subjected to the blow of a hammer or plunger which at the moment of impact moves at a speed and thereby acquires a momentum great enough for deforming instantaneously and pressing completely, or almost completely, the blank or billet into and particularly through the die.

A press for carrying out the invention is illustrated by way of example, on the accompanying drawing, in which.

Figure 3:
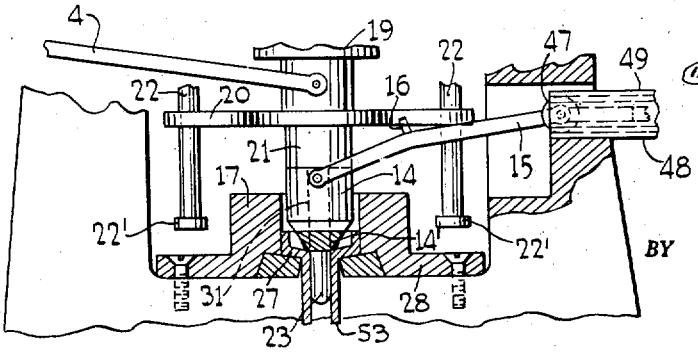

Fig. 3 a vertical section with parts in elevation of a part of the press, showing on an enlarged scale a severing plunger within the die, for use in removing the burr, after the production of a tube.

Figure 1:
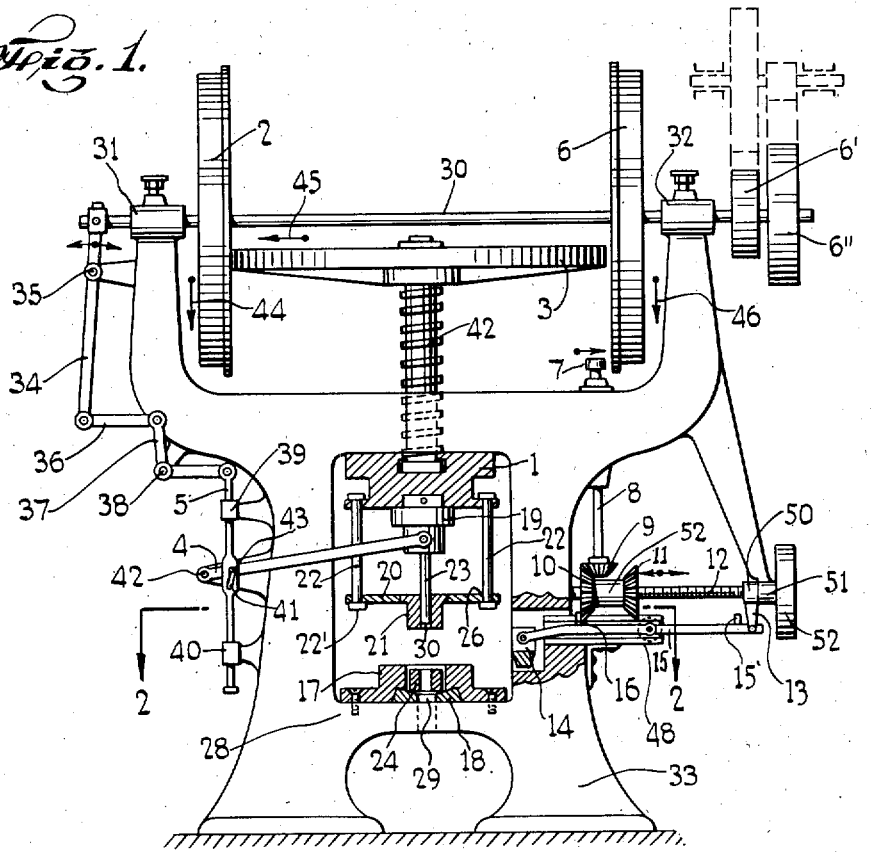
Figure 1 is a vertical section with parts in elevation of an impact extrusion press for the production of tubes.
Figure 2:
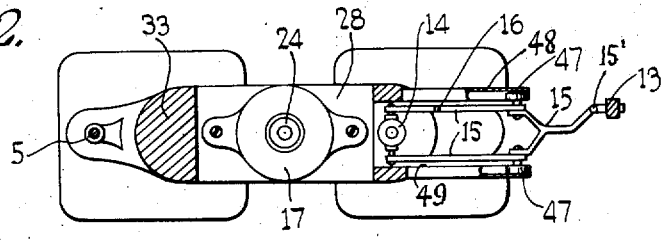
Fig. 2 is a sectional view along lines II—II in Fig. 1.

Referring to Fig. 1 a friction press is shown there provided with two friction disks 2, 6, rigidly mounted on a shaft which is journalled in bearings 31, 32 of a frame 33. On one projecting end of shaft 30 pulleys 6', 6'' are rigidly mounted for driving a belt drive at different speeds in well known manner. To the other projecting end of shaft 30 a lever 34 is journalled which is pivotally mounted at 35 on frame 33 and is connected through link 36 with a crank lever 37 pivotally mounted at 38 on frame 33. The other end of crank lever 37 is journalled to rod 5 which is slidably and frictionally held in lugs 39, 40 on frame 33 and provided with an elongated slit 41.

A disk 3 is mounted on a spindle 42 provided with a screw thread cooperating with and passing a screw threaded portion of frame 33. On the lower end of spindle 42, a tup or plunger 1 is mounted so that spindle 42 can freely rotate relative to the plunger. The latter is provided with an insert 19 which carries the mandrel 23. The plunger 1 has two guides 22, 22 which pass through holes 26 in an intermediate plunger portion 20. The plunger portion 20 is slidably mounted on the guides 22 and is thus movable relative to the plunger 1. The centre part of the plunger portion 20 is formed into a punch or patrix 21 which is adapted to move into a mold 17. The mold 17 is built into or on the anvil bed 28 of the press or is made integral therewith and is provided with a die 18 for shaping the article. The die 18 has a bore 29 which corresponds to the outer diameter of the article to be produced. The mold 17 receives the blank 24 which preferably has the shape of a hollow cylinder.

The guide bars 22 are provided with heads 22' at their lower ends on which the intermediate plunger portion 20 rests in the initial or rest position of plunger 1 as shown in Fig. 1. One end of a lever 4 is pivotally mounted at 42 on frame 33 and at its other end pivotally connected with the insert 19 which is rigidly mounted on plunger 1. A pin 43 on lever 4 slidably engages the slit 41.

In operation, a blank 24 the mass of which is small compared with that of plunger 1, is heated to a temperature close to but below its melting temperature. Thus, for instance, a blank of brass or copper should be heated to above 650° C. The hot blank is positioned in mold 17, upon die 18, and immediately thereafter shaft 30 is moved to the right so that disk 2 frictionally engages disk 3. Disk 2 revolves in the direction of arrow 44, rotates disk 3 in the direction of arrow 45 and screws spindle 42 downwardly through the stationary screw thread in frame 33. Thereby disk 3 is lowered, contacts disk 2 at increasing distances from shaft 30 and increases its speed of rotation, resulting in a speedily increasing downward movement of plunger 1. By adjusting the speed of shaft 30 and properly choosing the diameter of disk 3 and the pitch of the screw thread of spindle 42, any desired acceleration can be forced upon plunger 1 and thereby kinetic energy or momentum of the latter in the moment of the impact can be obtained.

Thus the tup or plunger 1 and plunger portions 20, 21 are first forcibly dropped from their uppermost rest position shown in Fig. 1 until patrix or mold cover 21 contacts and comes to a rest on blank 24. The downward drive of plunger 1 is continued at increasing speed while the guide rods 22 slide through the openings 26 in the portion 20 and the mandrel 23 slides through the patrix 21 into position through and projecting below the die or matrix 18.

It will be appreciated that the downward movement of plunger 1 with insert 19 and mandrel 23 goes on practically without resistance until patrix 21 has contacted and been seated upon the heated blank 24, mandrel 23 has been passed through the registering holes of the patrix and the blank into the aperture 29 of matrix 18 and projects below the latter, and that during this downward movement the speed and momentum of the heavy plunger 1 increase continuously. However, as soon as the lower surface of insert 19 of plunger 1 strikes the upper surface of patrix 21, an instantaneous blow is exerted upon the patrix and conveyed by the latter upon blank 24, resembling an instantaneous hammer blow by which the patrix drives blank 24 instantaneously into and through the ring-like space between the aperture 29 and the mandrel 23. By this instantaneous blow, the blank also is instantaneously extruded through that ring-like space and shaped into a substantially flawless, tube-like article.

The downward movement of plunger 1 with insert 19 and mandrel 23, as well as of patrix 21 is so fast that the blank does not cool down considerably. Moreover, by the blow exerted upon it, some heat is developed which to some extent compensates for heat losses. Thus the blank substantially retains its plastic state during shaping. The shaped article, in this exemplification of the invention forming a tube, remains suspended downwardly from the matrix until it is cooled sufficiently to solidify.

It will further be appreciated from the drawing that lever 4 is taken along by insert 19 of plunger 1 during the latter's rapidly increasing downward movement, and that in the lowermost position of the plunger and when the shaping of the blank has been substantially completed, pin 43 has moved downwardly in slit 41 so as to take along rod 5 and to trip the linkage connected with it. Thereby shaft 30 is shifted to the left to a neutral position from that shown in Fig. 1, breaks the frictional engagement between the disks 2 and 3, and ceases to forcibly drive plunger 1 further downward; disk 3 is stopped immediately thereafter and discharges its kinetic energy as a reduced pressure upon plunger 1, whereupon only the weight of the latter and the parts connected therewith rest on top of the shaped article until it is cooled and solidified.

In order to return the plunger 1 and the parts connected therewith into its uppermost rest position, shaft 30 is moved further to the left, preferably by hand, so that disk 6 frictionally engages disk 3 and, since disk 6 is rotated in the same direction indicated by arrow 46 as disk 2, disk 3 will now be rotated in the opposite direction. Thereby spindle 42 is screwed upwardly, taking along plunger 1 and the mandrel 23 rigidly connected therewith, while the patrix 21 remains in its lowermost position owing to its weight, whereby the mandrel is stripped from the extruded article. When the plunger 1 has been raised to such an extent that the lower heads 22' of the guide rods 22 engage the plunger portion 20, the latter is lifted and the plunger 1 with the patrix 21 eventually return to their uppermost rest position.

It will be appreciated that during this upward movement disk 3 gradually engages portions of disk 6 nearer to shaft 30 whereby its speed, as well as the speed at which plunger 1 rises are reduced. When plunger 1 approaches its uppermost position, lever 4 trips rod 5 slightly upwardly, whereby through the linkage previously described shaft 30 is somewhat shifted to the right and disengages disk 3 from disk 6, while due to the action of inertia, disk 3 with spindle 42 continue their rotation until plunger 1 arrives in its rest position and is held there by the self-locking action of the screw threads on spindle 42 and frame 33. A new cycle of operation is then started preferably manually by moving shaft 30 so far to the right that disk 2 frictionally engages again disk 3, and by positioning a new sufficiently hot bank in the mold.

When the extrusion of a tube is completed as described, the extruded article must be freed of the burr which is that part of the extruded article, shown at 27 in Fig. 3, which remained in the matrix 18 and is still connected with the finished tube, so that the latter can be removed downwardly from the die. A severing device which serves this purpose is shown in the drawing and comprises a hollow severing plunger 14 which, in the form shown, is tapered towards its lower sharp edge. The conical outer surface 14' is roughened to cause the severed burr to adhere to the severing plunger 14 when it is lifted. The adherence of the material to the severing plunger is increased by the contraction of the material which is now cooling down rapidly but was still quite hot when plunger 14 was driven into it.

This severing plunger can be inserted manually or, as is shown in the drawing, mechanically. For the latter purpose the plunger is pivotally held in one end of fork 15 on which guide rolls 47 are journalled. A casing 48 open on both front ends is provided with a slit 49 on top through which a pin 16 on one arm of fork 15 projects. Another pin 15' on that fork is arranged to enter that slit. The right end of fork 15 is journalled to an arm 13 on a nut 50 which engages a screw-threaded spindle 12. The right end of spindle 12 is smooth and passes a bearing 51 connected with frame 33; on its projecting end a small flywheel 52 is mounted. The left end of spindle 12 is also smooth and passes through a sleeve 52 on which bevelled gears 10, 11 are mounted. Sleeve 52 and the left end of spindle 12 are connected by a key and slot coupling, so that sleeve 52 can slide longitudinally on that end of spindle 12 but takes the latter along when rotated.

A small disk 7 is mounted on a spindle 8, journalled in frame 33; on the lower end of that spindle a bevelled gear 9 is mounted.

Assuming that a tube 53 is just extruded and is held by burr 27 in the die, and disk 6 has been brought into frictional engagement with disk 3 in order to lift plunger 1, then disk 6 also engages the small disk 7 and rotates it. Gear 9 engages gear 10 and thereby rotates spindle 12 and fly-wheel 52 in such a direction that nut 50 with arm 13 is moved to the left, thereby pushing fork 15 and severing plunger 14 to the left and eventually allowing the latter to rest upon the burr 27 as shown in Fig. 3. Just before plunger 14 arrives in this position, pin 15' engages the back of gear 11 and moves the latter together with sleeve 52 and gear 10 to the left, thereby disconnecting the gears 9 and 10. The motion of severing plunger 14 is completed by the inertia of fly-wheel 52. The dimensions of all the cooperating parts are such that plunger 1 just arrives in its uppermost rest position when plunger 14 arrives in its rest position on burr 27. At this moment shaft 30 is shifted somewhat to the right by the action of the linkage between rod 5 and that shaft as previously described.

Now shaft 30 is preferably manually moved so far to the right that disk 2 frictionally engages disk 3 and lowers plunger 1; thereby first patrix 21 reaches and comes to rest on plunger 14, while mandrel 23 continues its downward movement and passes hole 31 of severing plunger 14. Eventually insert 19 of plunger 1 strikes from above the patrix 21; this is shown in Fig. 3. This blow upon the patrix is translated to severing plunger 14 and drives the latter through the burr whereby the latter is cut off from the tube. This severing motion of plunger 14 is permitted by the position of the guide rolls 47 in casing 48 as shown in Fig. 3, where fork 15 is moved to its uttermost position at the left. The height of severing plunger 15 is preferably so little that rod 5 is dropped by lever 4 when the cutting edge of plunger 14 contacts matrix 18, whereby disk 2 is disengaged from disk 3 in the manner previously described.

Upon shifting shaft 30 fully to the left, disk 6 engages disk 3 and thereby lifts plunger 1 and eventually patrix 21 in the manner described above. Simultaneously disk 6 also engages disk 7 and rotates gear 9 with which gear 11 has been brought into engagement (by manually turning wheel 52) whereby spindle 12 is rotated in opposite direction and moves nut 50 and thereby fork 15 to the right, which takes along the severing plunger 14 with the burr adhering to its outer rough surface 14'. When fork 15 reaches its uttermost position to the right, pin 16 engages gear 10, shifts it and sleeve 52 as well as gear 11 to the right, whereby the latter is disengaged from gear 9. When plunger 1 arrives in its uppermost position, lever 4 trips rod 5 and shifts shaft 30 somewhat to the right, whereby disk 6 is disengaged from disk 3 and the press is ready for a new cycle of operation. In order to bring about at the proper instance the severing operating just described, fly-wheel 52 is to be turned by hand so far that gear 10 engages gear 9 just before disk 6 is again brought into engagement with disks 3 and 7 for performing the severing operation.

While the next blank is inserted and shaped in the die, plunger 14 is idle in its position shown in Fig. 1 and the burr may be removed from it by hand, or plunger 14 with the burr adhering to it may be replaced by a clean severing plunger.

The apparatus described is particularly suitable for carrying out the method of the present invention as the sliding central portion 20, 19 ensures the full force or momentum of the stroke of the plunger being applied to the blank.

I claim as my invention:

1. A method of producing articles which are relatively long compared with their cross-section, such as tubes and rods, comprising heating a blank or billet to a temperature near to but below its melting point, and subjecting the blank to an instantaneous impact blow to extrude the material through a die to form the elongated article.

2. A method of producing articles which are relatively long compared with their cross-section, such as tubes and rods, comprising heating a blank or billet to a temperature near to but below its melting point, subjecting the blank to an instantaneous impact blow to extrude the material through a die to form the elongated article and severing by a subsequent impact blow of sufficient momentum exerted upon a temporarily interposed cutting implement, the burr, formed from the residue of the blank, from the extruded article.

3. In a method of shaping metallic articles in the heat and under pressure, the steps of positioning a metallic blank or billet heated to a temperature near to but below its melting point freely, i. e., essentially spaced from any side wall, upon a die the shaping elements of which confine an opening adjacent to and covered by said blank or billet, the horizontal area of said opening being considerably smaller than the area of the largest horizontal cross section of said blank or billet, and subjecting said blank or billet to an instantaneous impact blow directed toward said opening, the momentum of said blow being sufficient to extrude instantaneously the blank or billet through said opening.

4. In a method of shaping metallic articles in the heat and under pressure, the steps of positioning a metallic blank or billet heated to a temperature near to but below its melting point freely, i. e., essentially spaced from any side wall, upon a die the shaping elements of which confine an opening adjacent to and covered by said blank or billet, the horizontal area of said opening being considerably smaller than the area of the largest horizontal cross section of said blank or billet, and subjecting said blank or billet immediately thereafter to an instantaneous impact blow directed toward said opening, the momentum of said blow being sufficient to extrude instantaneously the hot and almost plastic blank or billet through said opening.

5. In the method of shaping in the heat and under pressure metallic articles, the steps of positioning a metallic blank or billet heated to a temperature near to but below its melting point freely, i. e., essentially spaced from any side wall, upon a die the shaping elements of which confine an opening adjacent to and covered by said blank or billet, the horizontal area of said opening being considerably smaller than the area of the largest horizontal cross section of said blank or billet, forcibly driving a plunger with increasing speed and thereby momentum toward said blank or billet and said die and opening therein, so as to exert upon said blank or billet an instantaneous impact blow of a momentum sufficient to extrude instantaneously said hot blank or billet through said opening, and discontinuing said forcible drive of said plunger when said blow is being exerted.

6. In a method of shaping in the heat and under pressure metallic articles, the steps of positioning a metallic blank or billet heated to a temperature near to but below its melting point freely, i. e., essentially spaced from any side wall, upon a die the shaping elements of which confine an opening adjacent to and covered by said blank or billet, the horizontal area of said opening being considerably smaller than the area of the largest horizontal cross section of said blank or billet, forcibly driving a plunger with increasing speed and thereby momentum toward said blank or billet and said die and opening therein, so as to exert upon said blank or billet an instantaneous impact blow of a momentum sufficient to extrude instantaneously said hot blank or billet through said opening, and reducing considerably the force of said drive of the plunger when said blow is being exerted.

JOHANN KAFOWI.